Sept. 27, 1938.  H. P. JONES  2,131,561
TIRE DEFLATION INDICATOR SWITCH
Filed Aug. 24, 1936
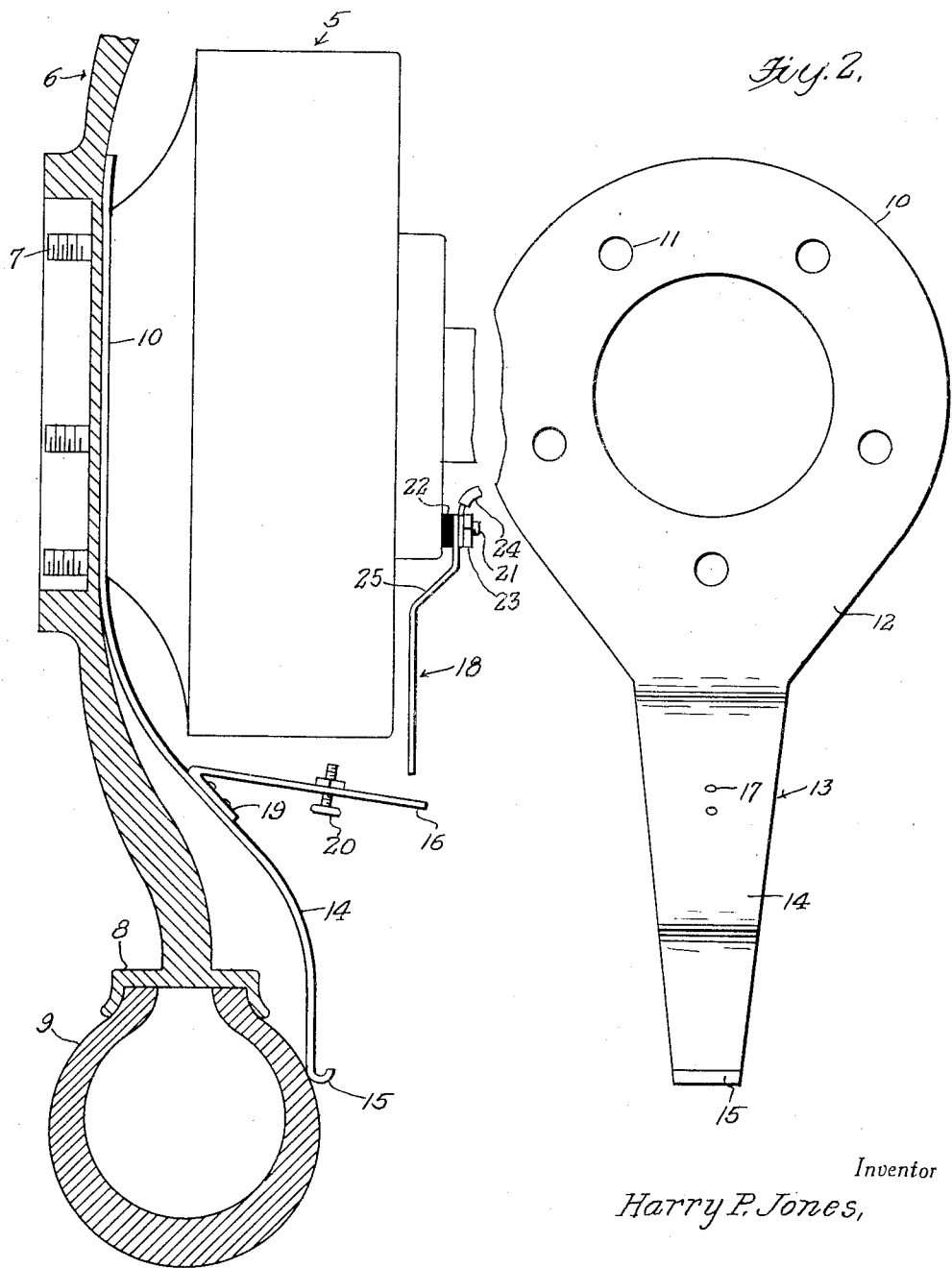
Inventor
Harry P. Jones,
By Clarence A. O'Brien
Hyman Berman
Attorneys Patented Sept. 27, 1938

2,131,561

UNITED STATES PATENT OFFICE 2,131,561

TIRE DEFLATION INDICATOR SWITCH

Harry P. Jones, Brawley, Calif., assignor of one-fourth to Paul Werve, El Centro, Calif.

Application August 24, 1936, Serial No. 97,688

9 Claims. (Cl. 200—58)

My invention relates generally to apparatus for indicating a deflated condition of a pneumatic tire on an automobile or other similar vehicle, and particularly to a switch arrangement operative to close a circuit only when the tire is in a deflated condition, and an important object of my invention is to provide a simple and efficient and practical arrangement of this character.

Other important objects of my invention will be apparent from a reading of the following description taken in connection with the drawing, wherein for purposes of illustration a preferred embodiment of my invention is shown.

In the drawing:—

Figure 1 is a general longitudinal vertical sectional view taken through a pneumatic tire equipped wheel of an automobile or similar vehicle and showing the manner in which the switch arms are mounted in conjunction therewith.

Figure 2 is an elevational view of the outboard side of the main switch arm.

Referring in detail to the drawing, the numeral 5 generally designates the brake drum housing of the automobile or other wheel on which is usually mounted the wheel which is generally designated 6 by means of bolts 7 which penetrate openings in the wheel, the said wheel having the usual rim 8 in which is mounted the pneumatic tire 9. In accordance with the present invention I provide a conductive material annulus which is generally designated 10 and which has openings 11 situated to properly receive the bolts 7 which extend from the brake drum housing 5 before the wheel 6 is placed in position, so that the annulus 10 is interposed between the brake drum housing and the wheel 6 in the manner clearly illustrated. The annulus 10 has a triangular enlargement 12 which extends from the lower edge thereof and terminates in a tapering spring finger 13 which lies along and spaced from the inboard side of the wheel 6 and has a spring curved portion 14 which acts to yieldably engage a curved foot 15 with the exterior of the side wall of the tire 9. The spring action of the arm 13 is such that when the tire flattens due to underinflation or deflation and the side wall thereof moves laterally, the arm 13 will be bent upwardly as a result, and the contact arm 16 mounted as indicated by the numeral 17 on an intermediate portion of the arm 13 will be carried upwardly sufficiently to engage the lower end of the stationary spring contact which is generally designated 18, so as to close a circuit to the indicating or alarm device (not shown).

The arm 16 is straight and has a sharply angulated portion 19 through which the fastening means 17 pass to support the arm 16 in a generally horizontal position but below and out of contact with the switch arm 18. The arm 16 is provided with a stop screw 20 to prevent the arm 16 from engaging and scraping the brake drum housing or any other portion of the wheel or adjacent mechanism, should such an arrangement be necessary.

The stationary spring arm 18 has the form clearly illustrated in Figure 1 of the drawing and is mounted by means of a bolt 21 and a dielectric block 22 insulating the arm 18 from the brake housing or axle housing adjacent the wheel, and the nut 23 on the bolt 21 which holds the arm 18 in place also serves to clamp the necessary conductor 24 which leads to the alarm device (not shown), the switch arm 13 being grounded to the opposite side of the conduit through its mounting directly in contact with the brake drum housing or the like 5.

The stationary contact arm 18 may be bent as indicated by the numeral 25 to give it a proper position to be struck and engaged by the inboard end of the contact arm 16 when the contact arm is in an elevated position, so that the circuit to the alarm or indicating device is intermittently operated as the wheel rotates during a deflated condition of the tire 9.

Although I have shown and described a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. In combination, an axle housing, an insulated member secured to said housing, a conductive member projecting from said insulated member in a direction away from the axis of said housing, a brake drum revolubly mounted on said axle housing and having wheel fastening bolts projecting therefrom, a conductive plate having openings receiving some of said bolts, said plate lying against said brake drum, a wheel formed with openings receiving said bolts and lying against the axially outward side of said conductive plate, nuts on said bolts holding said wheel and said conductive plate in place relative to said brake drum, said wheel being equipped with a pneumatic tire, and a conductive spring arm projecting radially from said conductive plate and having a finger constantly engaging the side wall of said tire, said spring arm further having a conductive element fixed thereon and projecting laterally therefrom in a position to engage and make electrical contact with said conductive member only while the said pneumatic tire is in an underinflated condition.

2. In combination, an axle housing, an insulated member secured to said housing, a conductive member projecting from said insulated member in a direction away from the axis of said housing, a brake drum revolubly mounted on said axle housing and having wheel fastening bolts projecting therefrom, a conductive plate having openings receiving some of said bolts, said plate lying against said brake drum, a wheel formed with openings receiving said bolts and lying against the axially outward side of said conductive plate, nuts on said bolts holding said wheel and said conductive plate in place relative to said brake drum, said wheel being equipped with a pneumatic tire, and a conductive spring arm projecting radially from said conductive plate and having a finger constantly engaging the side wall of said tire, said spring arm further having a conductive element fixed thereon and projecting laterally therefrom in a position to engage and make electrical contact with said conductive member only while the said pneumatic tire is in an underinflated condition, said conductive member occupying a relative stationary position on said axle housing.

3. In combination, an axle housing, an insulated member secured to said housing, a conductive member projecting from said insulated member in a direction away from the axis of said housing, a brake drum revolubly mounted on said axle housing and having wheel fastening bolts projecting therefrom, a conductive plate having openings receiving some of said bolts, said plate lying against said brake drum, a wheel formed with openings receiving said bolts and lying against the axially outward side of said conductive plate, nuts on said bolts holding said wheel and said conductive plate in place relative to said brake drum, said wheel being equipped with a pneumatic tire, a conductive spring arm projecting radially from said conductive plate and having a finger constantly engaging the side wall of said tire, said spring arm further having a conductive element fixed thereon and projecting laterally therefrom in a position to engage and make electrical contact with said conductive member only while the said pneumatic tire is in an underinflated condition, and adjustable means on said conductive element arranged to engage the periphery of said brake drum housing in an extreme operated position of said conductive spring arm to prevent contact of said conductive element with said brake drum housing and to predetermine the maximum engagement of said conductive element with said conductive member.

4. In combination, a brake drum, an axle structure on which said brake drum is mounted, a pneumatic tire equipped wheel fastened to and carried by said brake drum, a plate disposed between said wheel and said brake drum, means securing said wheel to said brake drum, said means traversing said plate and clamping said plate between the wheel and the brake drum, and a flexible arm carried by and extending radially away from said plate.

5. In combination, a brake drum, an axle structure on which said brake drum is mounted, a pneumatic tire equipped wheel fastened to and carried by said brake drum, a plate disposed between said wheel and said brake drum, means securing said wheel to said brake drum, said means traversing said plate and clamping said plate between the wheel and the brake drum, and a flexible arm carried by and extending radially away from said plate, said flexible arm being arranged to engage the pneumatic tire when deflated in a manner to be flexed in an inboard direction only.

6. In combination, a brake drum, an axle structure on which said brake drum is mounted, a pneumatic tire equipped wheel fastened to and carried by said brake drum, a plate disposed between said wheel and said brake drum, means securing said wheel to said brake drum, said means traversing said plate and clamping said plate between the wheel and the brake drum, and a flexible arm carried by and extending radially away from said plate, said flexible arm being arranged to engage the pneumatic tire when deflated in a manner to be flexed in an inboard direction only, said arm comprising a length of spring metal terminating in a rounded part engaging the side wall of the tire.

7. In combination, a brake drum, an axle structure on which said brake drum is mounted, a pneumatic tire equipped wheel fastened to and carried by said brake drum, a plate disposed between said wheel and said brake drum, means securing said wheel to said brake drum, said means traversing said plate and clamping said plate between the wheel and the brake drum, and a flexible arm carried by and extending radially away from said plate, a fixed contact mounted on said axle structure and projecting radially therefrom, for engagement by a radially outwardly located part of said flexible arm only when the tire is in an underinflated condition.

8. In combination, a brake drum, an axle structure on which said brake drum is mounted, a pneumatic tire equipped wheel fastened to and carried by said brake drum, a plate disposed between said wheel and said brake drum, means securing said wheel to said brake drum, said means traversing said plate and clamping said plate between the wheel and the brake drum, a flexible arm carried by and extending radially away from said plate, said flexible arm being arranged to engage the pneumatic tire when deflated in a manner to be flexed in an inboard direction only, and a fixed contact projecting radially from said axle mounting to be engaged by a part of said flexible arm as said flexible arm is flexed inwardly.

9. In combination, a brake drum, an axle structure on which said brake drum is mounted, a pneumatic tire equipped wheel fastened to and carried by said brake drum, a plate disposed between said wheel and said brake drum, means securing said wheel to said brake drum, said means traversing said plate and clamping said plate between the wheel and the brake drum, a flexible arm carried by and extending radially away from said plate, said flexible arm being arranged to engage the pneumatic tire when deflated in a manner to be flexed in an inboard direction only, said arm comprising a length of spring metal terminating in a rounded part engaging the side wall of the tire, a fixed contact projecting radially from said axle structure, and a contactor fixedly carried by said flexible arm intermediate the ends of said flexible arm, said contactor being arranged to engage said contact only when said flexible arm is flexed in an inboard direction by an underinflated condition of the tire.

HARRY P. JONES.